(12) United States Patent
Ning et al.

(10) Patent No.: US 12,202,130 B2
(45) Date of Patent: Jan. 21, 2025

(54) SEAL AFFIXING SYSTEM

(71) Applicant: OMRON Corporation, Kyoto (JP)

(72) Inventors: Xiaoguang Ning, Kyoto (JP); Yuki Tsuchihashi, Kyoto (JP); Masahiro Murai, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 192 days.

(21) Appl. No.: 18/168,672

(22) Filed: Feb. 14, 2023

(65) Prior Publication Data

US 2023/0286175 A1 Sep. 14, 2023

(30) Foreign Application Priority Data

Mar. 8, 2022 (JP) ................................. 2022-035202

(51) Int. Cl.
*B65G 47/91* (2006.01)
*B25J 15/06* (2006.01)

(52) U.S. Cl.
CPC ........ *B25J 15/0691* (2013.01); *B65G 47/917* (2013.01); *B65G 2201/022* (2013.01)

(58) Field of Classification Search
CPC ................ B25J 15/0691; B25J 15/0616; B25J 15/0052; B65G 47/917; B65G 2201/022
See application file for complete search history.

(56) References Cited

U.S. PATENT DOCUMENTS

| 6,336,492 B1 | 1/2002 | Nagaoka |
| 11,278,331 B2 * | 3/2022 | Bonutti ................. A61B 17/725 |
| 11,998,251 B2 * | 6/2024 | Bonutti .................. A61B 17/82 |
| 2004/0102804 A1 * | 5/2004 | Chin ................ A61B 17/00008 606/151 |
| 2013/0129464 A1 | 5/2013 | Regan et al. |
| 2020/0375388 A1 * | 12/2020 | MacFarlane ....... G06Q 20/3224 |

FOREIGN PATENT DOCUMENTS

JP 2017-133725 A 8/2017

OTHER PUBLICATIONS

Terada et al., Multifunctional ceramic sensors: Humidity-gas sensor and temperature-humidity sensor, 1982, IEEE, p. 95-101 (Year: 1982).*
Camara et al., A micro gas preconcentrator with improved performances for environmental monitoring, 2009, IEEE, p. 983-986 (Year: 2009).*

(Continued)

*Primary Examiner* — McDieunel Marc
(74) *Attorney, Agent, or Firm* — Sughrue Mion, PLLC

(57) ABSTRACT

In a seal affixing system, adsorption pores are arranged plurally along a first direction and a second direction on an adsorption face, and the plurality of adsorption pores are sectioned into a first suction region, a second suction region, and a third suction region containing a plurality of adsorption pores from a downstream side to an upstream side along a movement direction, and a controller controls a suction power generator to individually suck the first suction region, the second suction region, and the third suction region. According to the seal affixing system, a turbulent spot will not be generated in the affixed seal.

4 Claims, 9 Drawing Sheets

(56) References Cited

OTHER PUBLICATIONS

Kuroki et al., Oxidative Decomposition of Adsorbed Toluene Using Ozone Concentrated by Nonthermal Plasma Flow, 2019, IEEE, p. 3122-3128 (Year: 2019).*
Ichikawa et al., Adsorption Pad using Capillary Force for Uneven Surface, 2019, IEEE, p. 3692-3697 (Year: 2019).*
Extended European Search Report dated Aug. 8, 2023 in Application No. 23156603.5.

* cited by examiner

FIG.8

| AFFIXING STEP | PROGRESS OF AFFIXING STEP | MOVEMENT DISTANCE | FIRST VACUUM LINE V1 | SECOND VACUUM LINE V2 | THIRD VACUUM LINE V3 |
|---|---|---|---|---|---|
| FIRST AFFIXING STEP | AFFIXING OPERATION IS STARTED | | ON | ON | ON |
| SECOND AFFIXING STEP | AFFIXING BY ADSORPTION IN FIRST VACUUM LINE V1 IS COMPLETED | D1 | OFF | ON | ON |
| THIRD AFFIXING STEP | AFFIXING BY ADSORPTION IN FIRST AND SECOND VACUUM LINES V1 AND V2 IS COMPLETED | D1+D2 | OFF | OFF | ON |
| FOURTH AFFIXING STEP | AFFIXING STEP IS COMPLETED | D1+D2+D3 | OFF | OFF | OFF |

SEAL AFFIXING SYSTEM

BACKGROUND OF THE INVENTION

Field of the Invention

The present technique relates to, for example, a seal affixing system configured to affix a seal to a target using a robot arm of the seal affixing system.

Description of the Background Art

Japanese Patent Laying-Open No. 2017-133725 discloses a technique regarding a seal affixing system configured to affix a seal to a target.

SUMMARY OF THE INVENTION

In a seal affixing operation using a porous adsorption end effector provided in a seal affixing system, a seal is slid relatively to the target, on an adsorption face of the porous adsorption end effector while the seal is adsorbed. In this case, since the vacuum source of the seal adsorption pores of the porous adsorption mechanism is single, the area in which the adsorption pores are closed by the seal reduces as the seal affixing operation progresses, and air leakage occurs. As a result, the adsorption power of the seal adsorbed by the remaining adsorption pores deteriorates, and a turbulent spot such as a crease, an air bubble or the like can be generated in the affixed seal.

The object of the present technique is to provide a seal affixing system capable of affixing a seal to a target without generation of a turbulent spot such as a crease, an air bubble or the like in the affixed seal.

The seal affixing system according to the present technique includes a porous adsorption end effector having an adsorption face containing a plurality of adsorption pores to which a seal is to be adsorbed, a suction power generator configured to communicate with the adsorption pores and generate adsorption power of holding the seal by the adsorption face, and a controller configured to control the suction power generator in adsorbing the seal by the porous adsorption end effector and affixing the seal to an external target.

When a direction along a movement direction in which the porous adsorption end effector moves in affixing the seal to the target is referred to as a first direction, and a direction orthogonal to the first direction is referred to as a second direction, the adsorption pores are arranged plurally along the first direction and the second direction on the adsorption face, the plurality of adsorption pores are sectioned into a plurality of suction regions containing a plurality of the adsorption pores from a downstream side to an upstream side along the movement direction, and the controller controls the suction power generator to individually suck the plurality of suction regions. According to this configuration, it is possible to affix a seal to a target without generation of a turbulent spot in the affixed seal.

The controller conducts a control of sequentially stopping suction of the suction regions for which adsorption of the seal to the adsorption face is determined to be unnecessary as the operation of affixing the seal to the target progresses from a state where the seal is adsorbed in the plurality of suction regions. According to this configuration, it is possible to stop the suction of the suction region for which adsorption of the seal is unnecessary according to the operation of affixing the seal to the target. Suction power of the seal in the region where the seal is adsorbed will not deteriorate.

The controller determines that adsorption of the seal to the adsorption face is unnecessary when the suction pressure does not reach a specified value. According to this configuration, it is possible to easily conduct discrimination of the suction region for which adsorption of the seal is unnecessary.

A tool position controller configured to conduct a position control of the porous adsorption end effector is further provided, and the controller conducts a control of checking progress of an operation of affixing the seal to the target and sequentially stopping suction of the suction regions for which adsorption of the seal to the adsorption face is determined to be unnecessary on the basis of positional information of the porous adsorption end effector obtained from the tool position controller. According to this configuration, it is possible to easily conduct discrimination of the suction region for which adsorption of the seal is unnecessary.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 8 is a chart showing a list of affixing steps of the seal affixing system of the present embodiment.

DESCRIPTION OF THE PREFERRED EMBODIMENTS

Figure 1:
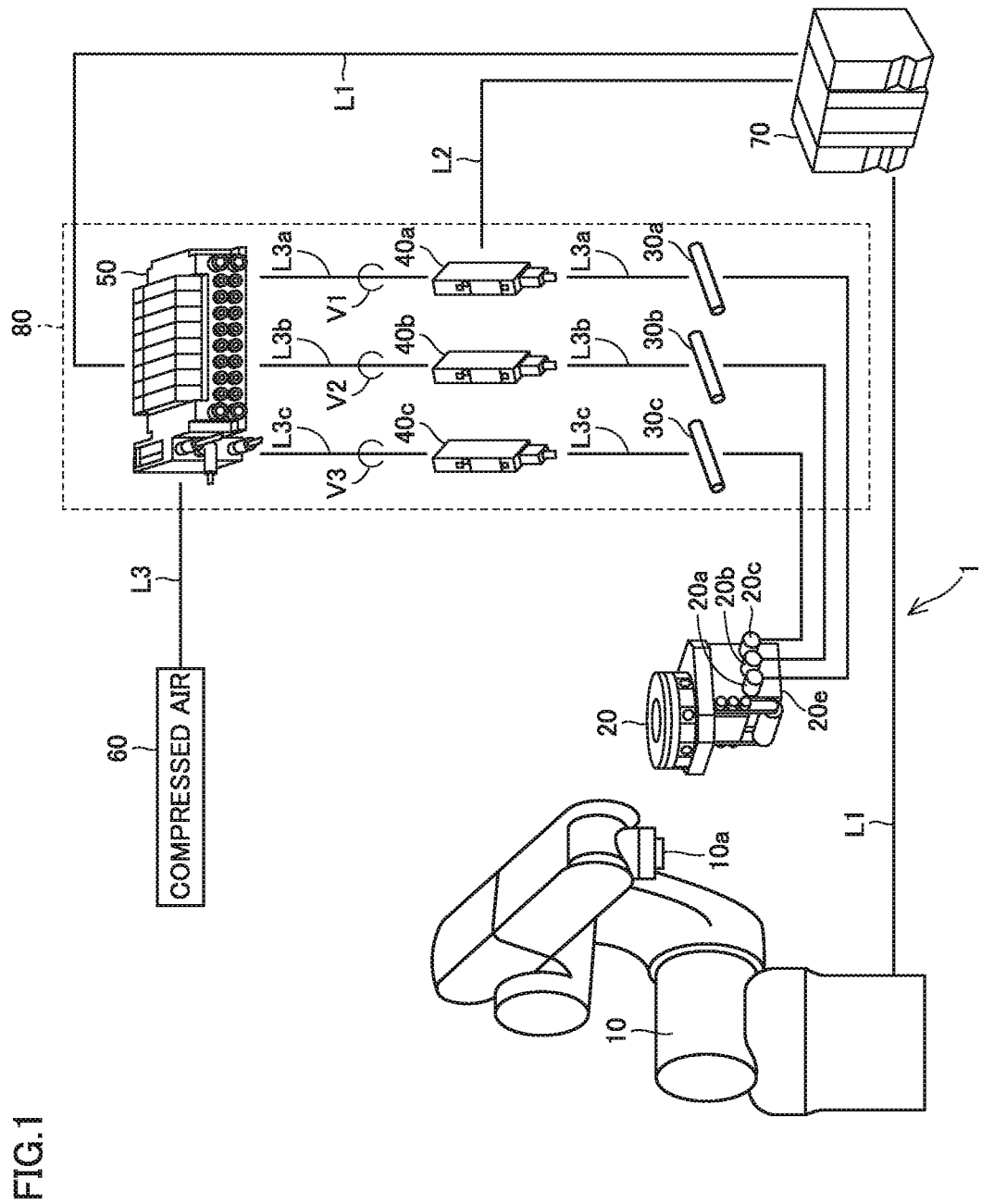
FIG. 1 is a schematic diagram showing the overall configuration of a seal affixing system of the present embodiment.

Hereinafter, embodiments of the present technique are described. The same or corresponding part is denoted by the same reference numeral, and description thereof is not sometimes repeated.

When a number, an amount and so on are referred in each embodiment described below, the scope of the present technique is not necessarily limited to the number, the amount and so on unless otherwise noted. In the following embodiments, each constituent is not necessarily essential for the present technique unless otherwise noted.

In the present specification, descriptions of "comprise", "include" and "have" are open-ended. That is, when a certain constituent is included, a constituent other than the constituent may be included, and need not be included. The present technique is not necessarily limited to those exerting every operation and effect referred in the present embodiment.

A. Application Example

One example of the situation where the present technique is applied is described. In the present specification, description is made for a seal affixing system configured to affix a seal to a target using a robot arm of the seal affixing system as a typical example, however, the application is not limited to a seal affixing system configured to affix a seal to a target using a robot arm of the seal affixing system.

B. Seal Affixing System 1

Figure 2:
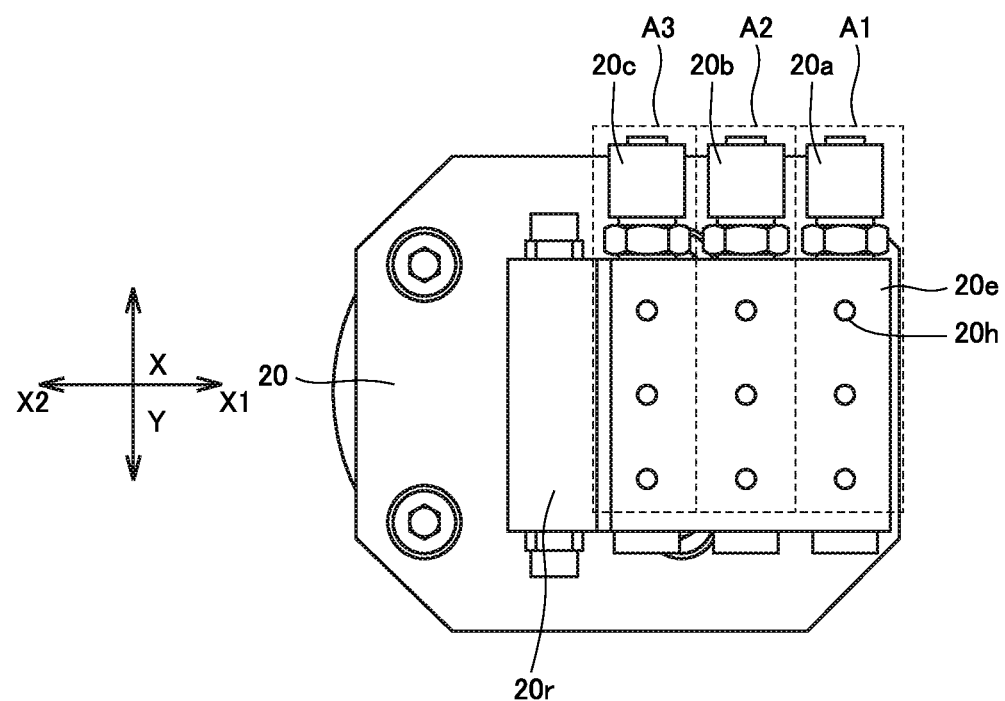
FIG. 2 is a view showing a schematic configuration of a porous adsorption end effector of the seal affixing system of the present embodiment.
Figure 3:
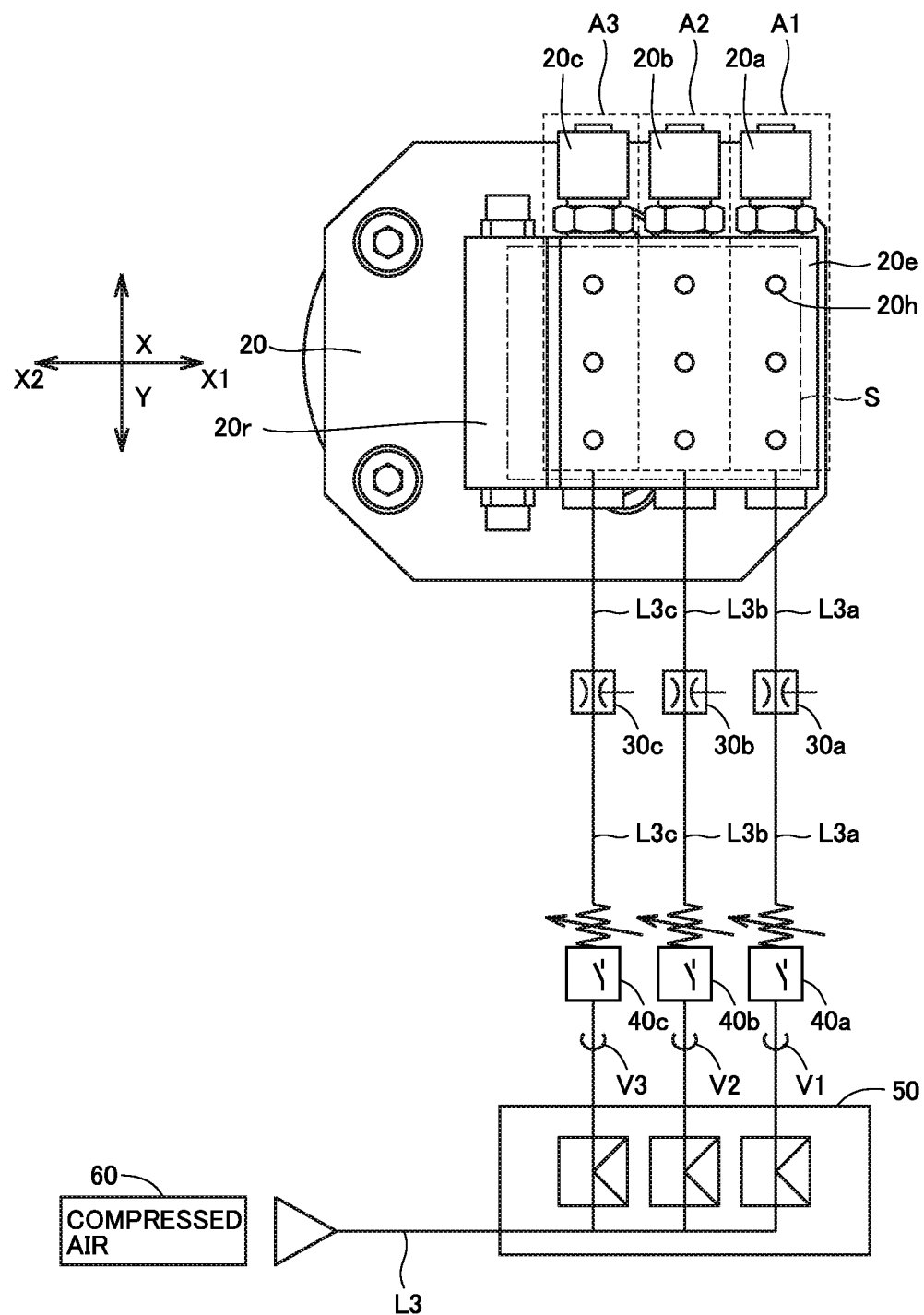
FIG. 3 is a circuit diagram showing the overall configuration of the seal affixing system of the present embodiment.
Figure 4:
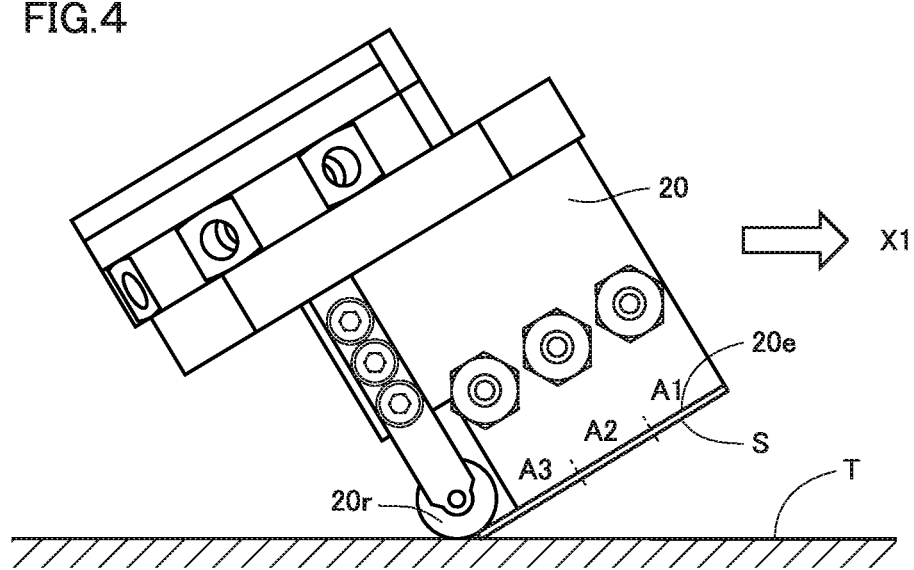
FIG. 4 is a chart of a first seal affixing step by the seal affixing system of the present embodiment.

Referring to FIGS. 1 to 3, the outline of a seal affixing system 1 in the present embodiment is described. FIG. 1 is a schematic diagram showing the overall configuration of seal affixing system 1, FIG. 2 is a view showing a schematic configuration of a porous adsorption end effector 20 of seal affixing system 1, and FIG. 3 is a circuit diagram showing the overall configuration of seal affixing system 1.

Referring to FIG. 1, seal affixing system 1 includes a vertical articulated 6-axis robot arm 10, porous adsorption end effector 20, a compressed air generator 60, a controller 70, and a suction power generator 80. Porous adsorption end effector 20 is fixed to a porous adsorption end effector attachment part 10a of vertical articulated 6-axis robot arm 10.

Vertical articulated 6-axis robot arm 10 conducts a position control of porous adsorption end effector 20. Porous adsorption end effector 20 has an adsorption face 20e including a plurality of adsorption pores 20h to which a seal S is to be adsorbed. Controller 70 controls suction power generator 80 in adsorbing seal S by porous adsorption end effector 20 and affixing seal S to an external target T.

In the present disclosure, suction power generator 80 has a first vacuum line V1, a second vacuum line V2, and a third vacuum line V3.

In first vacuum line V1, a first vacuum ejector 30a, and a first pressure switch 40a are connected in this order to a first suction port 20a provided in porous adsorption end effector 20 by a first air piping L3a. Similarly, in second vacuum line V2, a second vacuum ejector 30b, and a second pressure switch 40b are connected in this order to a second suction port 20b provided in porous adsorption end effector 20 by a second air piping L3b. Similarly, in third vacuum line V3, a third vacuum ejector 30c, and a third pressure switch 40c are connected in this order to a third suction port 20c provided in porous adsorption end effector 20 by a third air piping L3c.

First vacuum ejector 30a, second vacuum ejector 30b, and third vacuum ejector 30c form a vacuum pressure for seal adsorption in porous adsorption end effector 20 on the basis of fed compressed air. First pressure switch 40a, second pressure switch 40b, and third pressure switch 40c detect air pressure of the respective vacuum lines.

First vacuum line V1, second vacuum line V2, and third vacuum line V3 are connected to a valve manifold 50. Into valve manifold 50, compressed air is introduced, for example, from compressed air generator 60 by an air piping L3.

Valve manifold 50, first pressure switch 40a, second pressure switch 40b, and third pressure switch 40c are controlled by controller 70. Further, controller 70 in the present disclosure includes a tool position controller configured to conduct a position control of porous adsorption end effector 20 for vertical articulated 6-axis robot arm 10. Positional information of porous adsorption end effector 20 may be obtained from a tool position controller that is separately provided.

C. Porous Adsorption End Effector 20

Referring to FIG. 2, arrangement of plurality of adsorption pores 20h provided in adsorption face 20e of porous adsorption end effector 20, and relation of the vacuum lines are described. Here, the direction along a movement direction X1 in which porous adsorption end effector 20 moves in affixing seal S to target T (reverse direction is X2) is referred to as a first direction X, and the direction orthogonal to first direction X is referred to as a second direction Y.

In the present disclosure, adsorption pores 20h are arranged plurally along first direction X and second direction Y on adsorption face 20e. Specifically, when first direction X is regarded as a row direction, and second direction Y is regarded as a column direction, a total of nine adsorption pores 20h are provided while they are aligned in 3 rows and 3 columns.

Further, adsorption pores 20h are sectioned into a plurality of suction regions including plurality of adsorption pores 20h from the upstream side to the downstream side along movement direction X1.

Specifically, sectioning is made along the column direction of second direction Y into a first suction region A1, a second suction region A2, and a third suction region A3. Three adsorption pores 20h located in the column direction belonging to first suction region A1 communicate with first suction port 20a. Three adsorption pores 20h located in the column direction belonging to second suction region A2 communicate with second suction port 20b. Three adsorption pores 20h located in the column direction belonging to third suction region A3 communicate with third suction port 20c.

On the upstream side of movement direction X1 in which porous adsorption end effector 20 moves, a seal holding roller 20r is provided.

D. Adsorption Control of Each Vacuum Line

Referring to FIG. 3, adsorption control of each vacuum line is described. First vacuum line V1 communicates with first suction port 20a of porous adsorption end effector 20, and suction control of first suction region A1 is conducted. Supply of compressed air fed from compressed air generator 60 is controlled by controller 70 by a control line L1 (see FIG. 1), and distributed to first vacuum line V1 by valve manifold 50. Air pressure of first vacuum line V1 is detected by first pressure switch 40a, and monitored in controller 70 by a control line L2 (see FIG. 1).

Second vacuum line V2 communicates with second suction port 20b of porous adsorption end effector 20, and suction control of second suction region A2 is conducted. Supply of compressed air fed from compressed air generator 60 is controlled by controller 70 by control line L1 (see FIG. 1), and distributed to second vacuum line V2 by valve manifold 50. Air pressure of second vacuum line V2 is detected by second pressure switch 40b, and monitored in controller 70 by control line L2 (see FIG. 1).

Third vacuum line V3 communicates with third suction port 20c of porous adsorption end effector 20, and suction control of third suction region A3 is conducted. Supply of compressed air fed from compressed air generator 60 is controlled by controller 70 by control line L1 (see FIG. 1), and distributed to third vacuum line V3 by valve manifold 50. Air pressure of third vacuum line V3 is detected by third pressure switch 40c, and monitored in controller 70 by control line L2 (see FIG. 1).

E. Affixing of Seal S by Seal Affixing System 1

Next, referring to FIGS. 4 to 8, affixing steps of seal S by seal affixing system 1 having the above configuration is described. FIGS. 4 to 7 are charts of the first to the fourth affixing steps of seal affixing system 1, and FIG. 8 shows a list of affixing steps of seal affixing system 1.

In seal affixing system 1, adsorption pores 20h provided in porous adsorption end effector 20 are sectioned into first suction region A1, second suction region A2, and third suction region A3 from the downstream side (X1 side) to the upstream side (X2 side) along movement direction X1 of porous adsorption end effector 20. Controller 70 controls to individually suck these first suction region A1, second suction region A2, and third suction region A3.

As one example of the present disclosure, as the operation of affixing seal S to target T progresses from the state where seal S is adsorbed in first suction region A1, second suction region A2, and third suction region A3, controller 70 conducts a control of sequentially stopping suction to first suction region A1, second suction region A2, or third suction region A3 for which adsorption of seal S to adsorption face 20e is determined to be unnecessary.

Specifically, controller 70 determines that adsorption of seal S to adsorption face 20e is unnecessary when the suction pressure does not reach a specified value. For example, when seal S that has been suctioned in first suction region A1 moves on adsorption face 20e with movement of porous adsorption end effector 20, and seal S comes off from first suction region A1, the suction pressure having been detected by first pressure switch 40a no longer reaches a specified value.

Accordingly, controller 70 discriminates that the suction pressure having been detected by first pressure switch 40a does not reach a specified value, and stops distribution of compressed air to first vacuum line V1 by valve manifold 50 to end suction in first suction region A1. The same control is conducted also in second vacuum line V2 and third vacuum line V3.

On the basis of the above control, the first to fourth affixing steps of seal S to target T are described. First, referring to FIGS. 4 and 8, in the first affixing step, an operation of affixing seal S to target T by porous adsorption end effector 20 that is positioned at a predetermined position by vertical articulated 6-axis robot arm starts.

In this state, seal S is adsorbed in all regions including first suction region A1, second suction region A2, and third suction region A3 of adsorption face 20e, and compressed air is fed to first vacuum line V1, second vacuum line V2, and third vacuum line V3, and operation of each line is in ON state (affixing operation starts).

Figure 5:
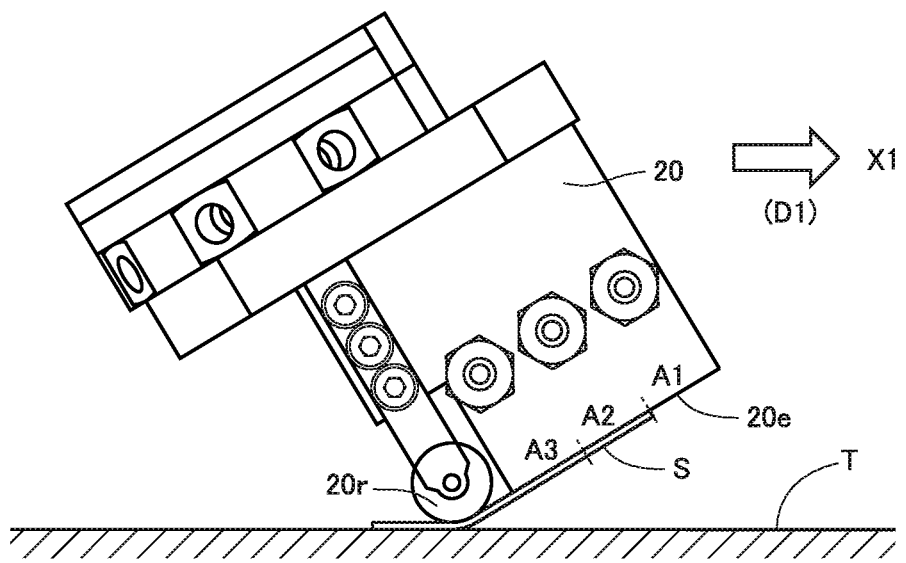
FIG. 5 is a chart of a second seal affixing step by the seal affixing system of the present embodiment.

Next, referring to FIGS. 5 and 8, in the second affixing step, porous adsorption end effector 20 moves a predetermined distance (D1) in movement direction X1, and the operation of affixing seal S to target T progresses. As a result, seal S comes off from first suction region A1. In this state, the suction pressure having been detected by first pressure switch 40a of first vacuum line V1 no longer reaches a specified value.

Accordingly, controller 70 discriminates that the suction pressure having been detected by first pressure switch 40a does not reach a specified value, and stops distribution of compressed air to first vacuum line V1 by valve manifold 50 to end suction in first suction region A1. First vacuum line V1 is in OFF state, and second vacuum line V2 and third vacuum line V3 are in ON state (affixing by adsorption in first vacuum line V1 ends).

Figure 6:
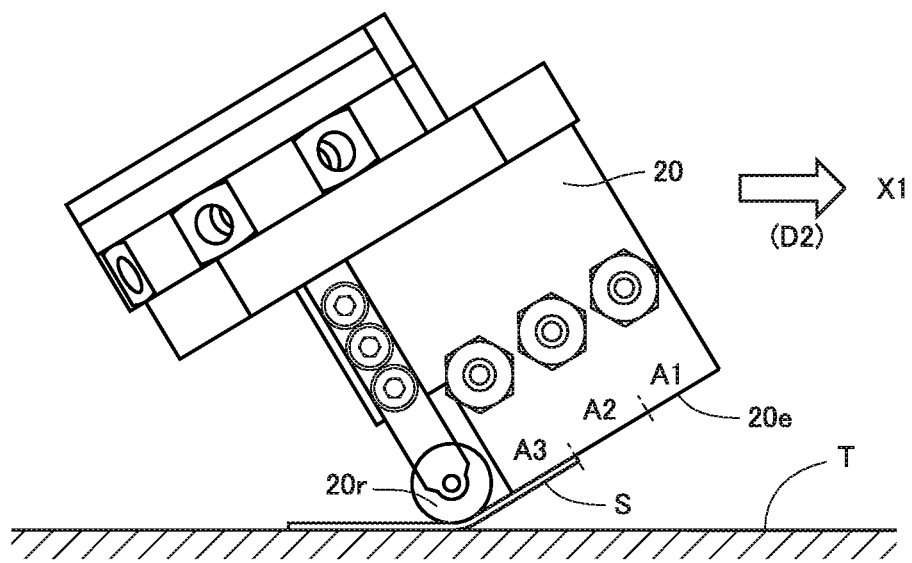
FIG. 6 is a chart of a third seal affixing step by the seal affixing system of the present embodiment.
Figure 7:
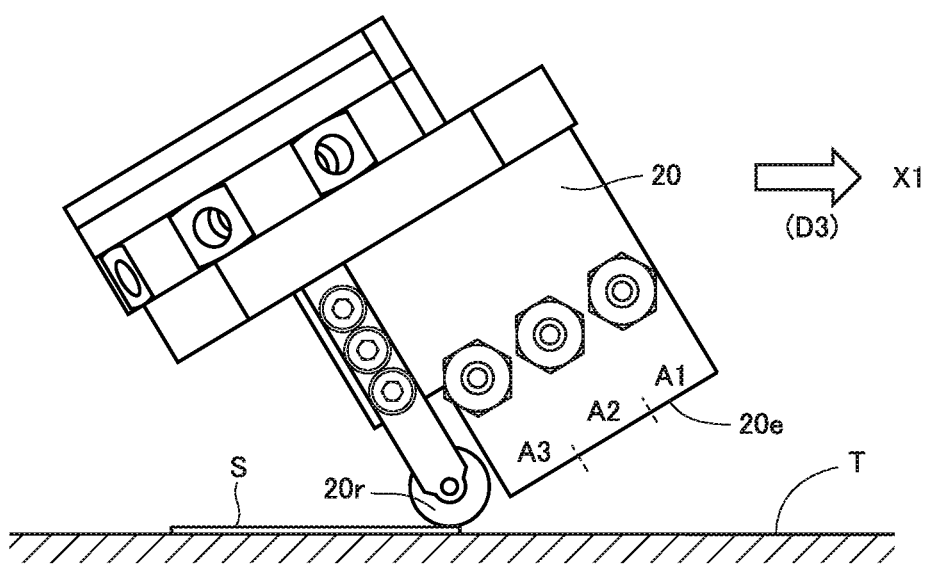
FIG. 7 is a chart of a fourth seal affixing step by the seal affixing system of the present embodiment.

Next, referring to FIGS. 6 and 8, in the third affixing step, porous adsorption end effector 20 further moves a predetermined distance (D2) in movement direction X1, and the operation of affixing seal S to target T progresses. As a result, seal S comes off from second suction region A2. In this state, the suction pressure having been detected by second pressure switch 40b of second vacuum line V2 no longer reaches a specified value.

Accordingly, controller 70 discriminates that the suction pressure having been detected by second pressure switch 40b does not reach a specified value, and stops distribution of compressed air to second vacuum line V2 by valve manifold 50 to end suction of second suction region A2. First vacuum line V1 and second vacuum line V2 are in OFF state, and third vacuum line V3 is in ON state (affixing by adsorption in first vacuum line V1 and second vacuum line V2 ends).

Next, referring to FIGS. 6 and 8, in the fourth affixing step, porous adsorption end effector 20 further moves a predetermined distance (D3) in movement direction X1, and the operation of affixing seal S to target T progresses. As a result, seal S comes off from third suction region A3. In this state, the suction pressure having been detected by third pressure switch 40c of third vacuum line V3 no longer reaches a specified value.

Accordingly, controller 70 discriminates that the suction pressure having been detected by third pressure switch 40c does not reach a specified value, and stops distribution of compressed air to third vacuum line V3 by valve manifold 50 to end suction of third suction region A3. First vacuum line V1, second vacuum line V2, and third vacuum line V3 are in OFF state (affixing operation completes). Thus, the affixing step of seal S to target T using porous adsorption end effector 20 completes.

As described above, according to seal affixing system 1 in the present disclosure, suction operation of the suction region in which suction operation of seal S ends is stopped. As a result, adsorption power of seal S to adsorption face 20s does not change, so that adsorption power of seal S adsorbed by the remaining adsorption pores 20h will not deteriorate. This makes it possible to prevent generation of a turbulent spot such as a crease, an air bubble or the like in seal S at the time of affixing seal S to target T.

F. Other Embodiment of Porous Adsorption End Effector 20A

Figure 9:
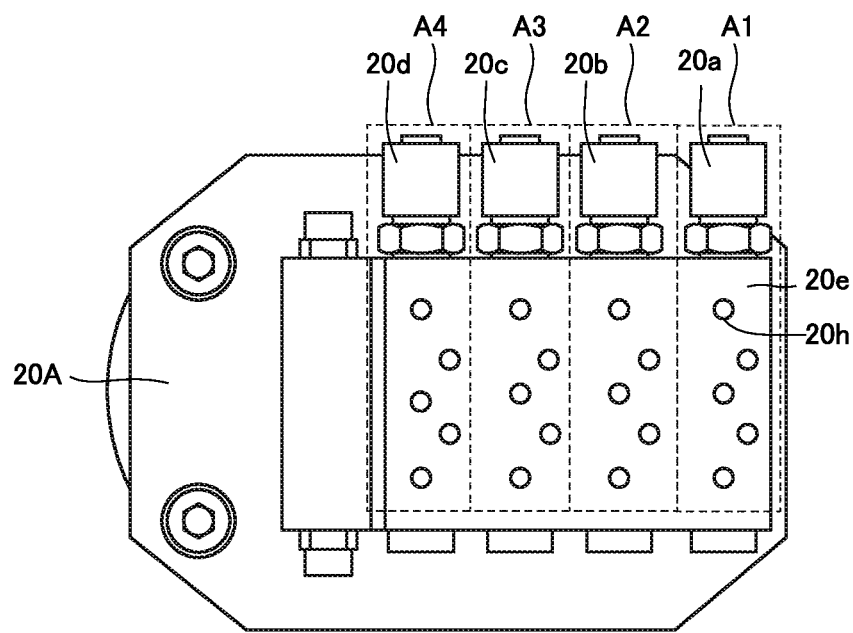
FIG. 9 is a view showing a schematic configuration of a porous adsorption end effector of a seal affixing system of the other embodiment.

Referring to FIG. 9, a porous adsorption end effector 20A of other embodiment is described. While porous adsorption end effector 20 of the above embodiment is described for the case where the suction region is divided into three regions: first suction region A1, second suction region A2, and third suction region A3, the number of suction regions is not limited to three, and as shown in FIG. 9, the suction region may be divided into four regions: first suction region A1, second suction region A2, third suction region A3, and a fourth suction region A4, or may be divided into more regions.

In porous adsorption end effector 20A, the suction region is divided into four regions, and suction ports to be connected to respective regions, namely, first suction port 20a, second suction port 20b, third suction port 20c, and a fourth suction port 20d are provided. Although omitted in the drawing, suction power generator 80 also has first vacuum line V1, second vacuum line V2, third vacuum line V3, and a fourth vacuum line V4.

Further, in porous adsorption end effector 20A, adsorption pores 20h arranged in each region are not aligned on the same straight line, but are arranged at random positions in each region.

Also in the case where porous adsorption end effector 20A is employed, the same operation and effect as in seal affixing system 1 can be obtained.

G. Other Determination of Unnecessity of Adsorption of Seal S to Adsorption Face 20e by Controller 70

In seal affixing system 1, in determination of unnecessity of adsorption of seal S to adsorption face 20e by controller 70, adsorption of seal S to adsorption face 20e is determined to be unnecessary when a suction pressure does not reach a specified value in adsorption control of each vacuum line, however, the following determining method may also be employed.

Referring again to FIGS. 4 to 8, in each affixing step of seal S, a control of further moving porous adsorption end effector 20 a predetermined distance in movement direction X1 is conducted. Since the control is conducted by the tool position controller configured to conduct a position control of porous adsorption end effector 20 for vertical articulated 6-axis robot arm, controller 70 may check the progress of the operation of affixing seal S to target T on the basis of positional information of porous adsorption end effector 20 obtained from the tool position controller, and conduct a control of sequentially stopping suction to the vacuum line for which adsorption of seal S to adsorption face 20e is determined to be unnecessary.

Specifically, on the basis of the positional information regarding movement of predetermined distance D1 in movement direction X1 of porous adsorption end effector 20, controller 70 ends the suction in first suction region A1 (affixing by adsorption in first vacuum line V1 ends). Further, on the basis of the positional information regarding movement of predetermined distance D2 in movement direction X1 of porous adsorption end effector 20, controller 70 ends the suction in second suction region A2 (affixing by adsorption in second vacuum line V2 ends). Further, on the basis of the positional information regarding movement of predetermined distance D3 in movement direction X1 of porous adsorption end effector 20, controller 70 ends the suction in third suction region A3 (affixing by adsorption in third vacuum line V3 ends).

The same operation and effect as aforementioned seal affixing system 1 can be obtained even in the case of employing the control of checking the progress of the operation of affixing seal S to target T on the basis of positional information of porous adsorption end effector 20 obtained from the seal position controller, and sequentially stopping suction to the vacuum line for which adsorption of seal S to adsorption face 20e is determined to be unnecessary.

H. Additional Note

The present embodiment described above includes the following technical idea.

[Configuration 1] A seal affixing system including:
- a porous adsorption end effector (20) having an adsorption face (20e) containing a plurality of adsorption pores (20h) to which seal (S) is to be adsorbed;
- a suction power generator (80) configured to communicate with the adsorption pores (20h) and generate adsorption power of holding the seal (S) by the adsorption face (20e); and
- a controller (70) configured to control the suction power generator (80) in adsorbing the seal (S) by the porous adsorption end effector (20) and affixing the seal (S) to an external target (T),
- wherein when a direction along a movement direction (X1) in which the porous adsorption end effector (20) moves in affixing the seal (S) to the target (T) is referred to as a first direction (X), and a direction orthogonal to the first direction (X) is referred to as a second direction (Y),
- the adsorption pores (20h) are arranged plurally along the first direction (X) and the second direction (Y) on the adsorption face (20e),
- the plurality of adsorption pores (20h) are sectioned into a plurality of suction regions (A1, A2, A3) containing a plurality of the adsorption pores (20h) from a downstream side to an upstream side along the movement direction (X1), and
- the controller (70) controls the suction power generator (80) to individually suck the plurality of suction regions (A1, A2, A3).

[Configuration 2] The seal affixing system according to Configuration 1, wherein
- the controller (70)
- conducts a control of sequentially stopping suction of the suction regions (A1, A2, A3) for which adsorption of the seal (S) to the adsorption face (20e) is determined to be unnecessary as an operation of affixing the seal (S) to the target (T) progresses,
- from a state where the seal (S) is adsorbed in the plurality of suction regions (A1, A2, A3).

[Configuration 3] The seal affixing system according to Configuration 2, wherein the controller (70) determines that adsorption of the seal (S) to the adsorption face (20e) is unnecessary when a suction pressure does not reach a specified value.

[Configuration 4] The seal affixing system according to Configuration 2, further including:
- a tool position controller configured to conduct a position control of the porous adsorption end effector (20),
- wherein the controller (70) conducts a control of checking progress of an operation of affixing the seal (S) to the target (T) and sequentially stopping suction of the suction regions (A1, A2, A3) for which adsorption of the seal (S) to the adsorption face (20e) is determined to be unnecessary on the basis of positional information of the porous adsorption end effector (20) obtained from the tool position controller.

<I. Advantages>

According to the seal affixing system of the present embodiment, it becomes possible to affix a seal to a target without generation of a turbulent spot in the seal to be affixed.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A seal affixing system comprising:

a porous adsorption end effector having an adsorption face containing a plurality of adsorption pores to which seal is to be adsorbed;

a suction power generator configured to communicate with the adsorption pores and generate adsorption power of holding the seal by the adsorption face; and a controller configured to control the suction power generator in adsorbing the seal by the porous adsorption end effector and affixing the seal to an external target, wherein when a direction along a movement direction in which the porous adsorption end effector moves in affixing the seal to the target is referred to as a first direction, and a direction orthogonal to the first direction is referred to as a second direction, the adsorption pores are arranged plurally along the first direction and the second direction on the adsorption face, the plurality of adsorption pores are sectioned into a plurality of suction regions containing a plurality of the adsorption pores from a downstream side to an upstream side along the movement direction, and the controller controls the suction power generator to individually suck the plurality of suction regions.

2. The seal affixing system according to claim 1, wherein the controller conducts a control of sequentially stopping suction of the suction regions for which adsorption of the seal to the adsorption face is determined to be unnecessary as an operation of affixing the seal to the target progresses, from a state where the seal is adsorbed in the plurality of suction regions.

3. The seal affixing system according to claim 2, wherein the controller determines that adsorption of the seal to the adsorption face is unnecessary when a suction pressure does not reach a specified value.

4. The seal affixing system according to claim 2, further comprising a tool position controller configured to conduct a position control of the porous adsorption end effector, wherein the controller conducts a control of checking progress of the operation of affixing the seal to the target and sequentially stopping suction of the suction regions for which adsorption of the seal to the adsorption face is determined to be unnecessary on the basis of positional information of the porous adsorption end effector obtained from the tool position controller.

* * * * *